(12) United States Patent
Chitty

(10) Patent No.: US 6,929,068 B2
(45) Date of Patent: Aug. 16, 2005

(54) NON-CRYOGENIC PRODUCTION OF NITROGEN FOR ON-SITE INJECTION IN WELL CLEAN OUT

(75) Inventor: Gregory H. Chitty, Houston, TX (US)

(73) Assignee: Weatherford/Lamb, Inc., Houston, TX (US)

(*) Notice: Subject to any disclaimer, the term of this patent is extended or adjusted under 35 U.S.C. 154(b) by 71 days.

(21) Appl. No.: 10/315,734

(22) Filed: Dec. 10, 2002

(65) Prior Publication Data

US 2003/0075320 A1 Apr. 24, 2003

Related U.S. Application Data

(63) Continuation of application No. 09/642,447, filed on Aug. 18, 2000, now Pat. No. 6,494,262.

(51) Int. Cl.[7] .............................................. E21B 37/08
(52) U.S. Cl. ................................. 166/305.1; 166/311
(58) Field of Search ............................. 166/305.1, 311, 166/401, 75.12, 90.1, 105.5, 105.6; 175/71; 95/47, 138; 96/4, 6, 10

(56) References Cited

U.S. PATENT DOCUMENTS

| | | | |
|---|---|---|---|
| 3,662,828 A | 5/1972 | Hutchison | 166/312 |
| 4,457,375 A | 7/1984 | Cummins | 166/309 |
| 5,125,455 A | 6/1992 | Harris et al. | 166/292 |
| 5,388,650 A | 2/1995 | Michael | 175/71 |
| 5,663,121 A | 9/1997 | Moody | 507/102 |
| 5,749,422 A | 5/1998 | Michael | 175/71 |
| 5,862,869 A | 1/1999 | Michael | 175/71 |
| 6,041,873 A | 3/2000 | Michael | 175/71 |
| 6,206,113 B1 | 3/2001 | Michael | 175/71 |
| 6,234,258 B1 * | 5/2001 | Karigan | 175/66 |
| 6,269,880 B1 * | 8/2001 | Landry | 166/265 |
| 6,494,262 B1 | 12/2002 | Chitty | 166/311 |
| 6,527,050 B1 * | 3/2003 | Sask | 166/299 |

FOREIGN PATENT DOCUMENTS

GB 2 186 682 8/1987 ............. F17D/1/02

OTHER PUBLICATIONS

Hardenburger, Thomas L., et al. "Optimization of On–Site Non–Cryogenic Nitrogen Systems Relative to Nitrogen Use Patterson," Air Liquide America Corporation, 1992 AIChE Spring National Meeting, Mar. 29, 1992–Apr. 2, 1992, New Orleans, LA, 8 Pages.

Niject Services Company, "Nitrogen Injection For Enhanced Recovery Of Oil, Gas, And Condensate," C. 1981.

Shouldice, S.P., "Liquid Nitrogen Developments and Applications In Drilling And Completion Operations," Journal of Canadian Petroleum Technology, Winter, 1964–65, Montreal, 15th Annual Technical Meeting, P. & N.G. Division, C.I.M., Calgary, May 1964, pp. 158–164.

* cited by examiner

Primary Examiner—Zakiya Walker
(74) Attorney, Agent, or Firm—Moser, Patterson & Sheridan, L.L.P.

(57) ABSTRACT

The present invention generally relates to a well servicing system for cleaning out of a well in which a compressed inert gas, produced by the non-cryogenic separation of air is delivered to the region of the well where particulate matter has collected that inhibits the ability of the well to produce.

5 Claims, 5 Drawing Sheets

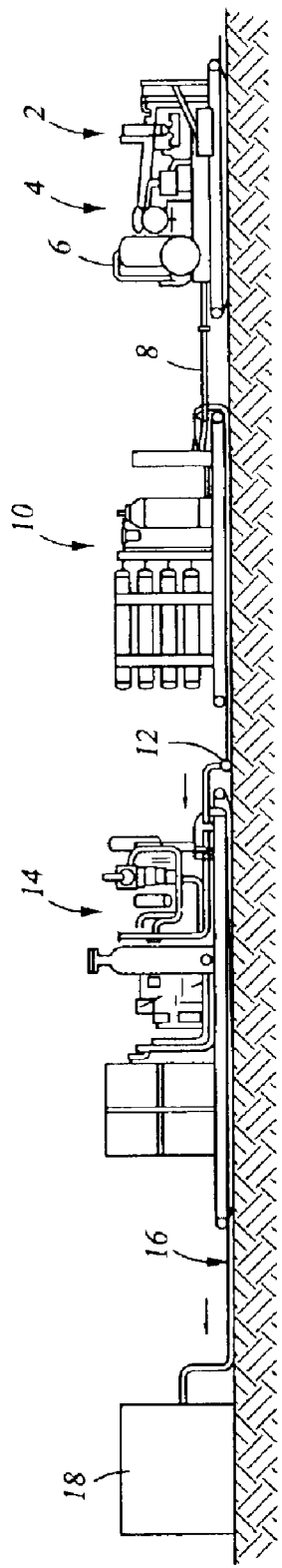
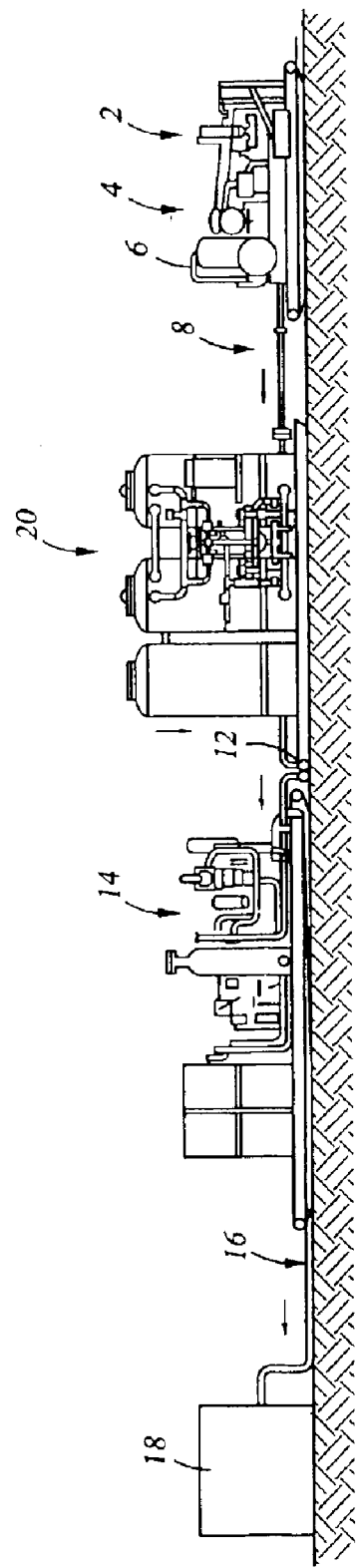

NON-CRYOGENIC PRODUCTION OF NITROGEN FOR ON-SITE INJECTION IN WELL CLEAN OUT

CROSS-REFERENCE TO RELATED APPLICATIONS

This application is a continuation of U.S. patent application Ser. No. 09/642,447, filed Aug. 18, 2000 now U.S. Pat. No. 6,494,262, which is herein incorporated by reference.

BACKGROUND OF THE INVENTION

1. Field of the Invention

The present invention is directed to methods of cleaning out wells using an inert gas. More specifically, the invention is directed to methods of cleaning out wells which employ an inert gas in a region of the well where collected matter has inhibited the ability of the well to produce. The inert gas, typically nitrogen gas, is supplied on-site by the separation of air using a membrane or a pressure swing adsorption system.

2. Background of the Related Art

In the cleaning out of oil or gas or geothermal wells, a fluid is typically delivered to a particular area of the well. For example, in a cleaning out operation, fluid must be introduced in the area of the well to be cleaned to remove the sand, scale or other substances that have effected the ability of the well to produce. One such fluid includes a foam consisting of nitrogen gas and liquid. Nitrogen can also be combined with a surfactant, foaming agent or water for different applications, like well treating.

One method of cleaning out a well includes the use of air cooled to cryogenic temperatures. The frozen air not only reduces the threat of downhole combustion but also freezes the ground to prevent the influx of water during clean out. As is well known, cooling to cryogenic temperatures is costly and requires additional heavy equipment which may not be readily available, particularly when the well is in a remote location like offshore. It is also common to use liquid nitrogen as the source of gas. Liquid nitrogen, however, is disadvantageous because it is considerably more expensive to use than air and difficult to obtain in remote locations.

It would therefore be desirable to devise a method by which an inert gas, typically nitrogen gas, may be conveniently and efficiently supplied to an area of a well to be cleaned out which eliminates the problems associated with cryogenic nitrogen and other sources of nitrogen gas.

SUMMARY OF THE INVENTION

The present invention is generally directed to a method for cleaning out oil and/or gas or a geothermal wells in which a compressed inert gas is delivered to the area of the well where production is inhibited. The inert gas is obtained from an on-site, non-cryogenic source. In particular, the source of the inert gas is air which is preferentially separated into an inert gas rich fraction and an oxygen waste gas fraction such as by membrane separation or by pressure swing adsorption, for example.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a schematic view of an embodiment of the invention showing an above surface apparatus for generating a nitrogen rich gas from an air-separation membrane to be delivered to an area of a well where production is inhibited;

FIG. 2 is a schematic view similar to FIG. 1 in which a nitrogen rich gas is generated by a pressure swing adsorption unit;

DETAILED DESCRIPTION OF THE PREFERRED EMBODIMENT

Figure 3:
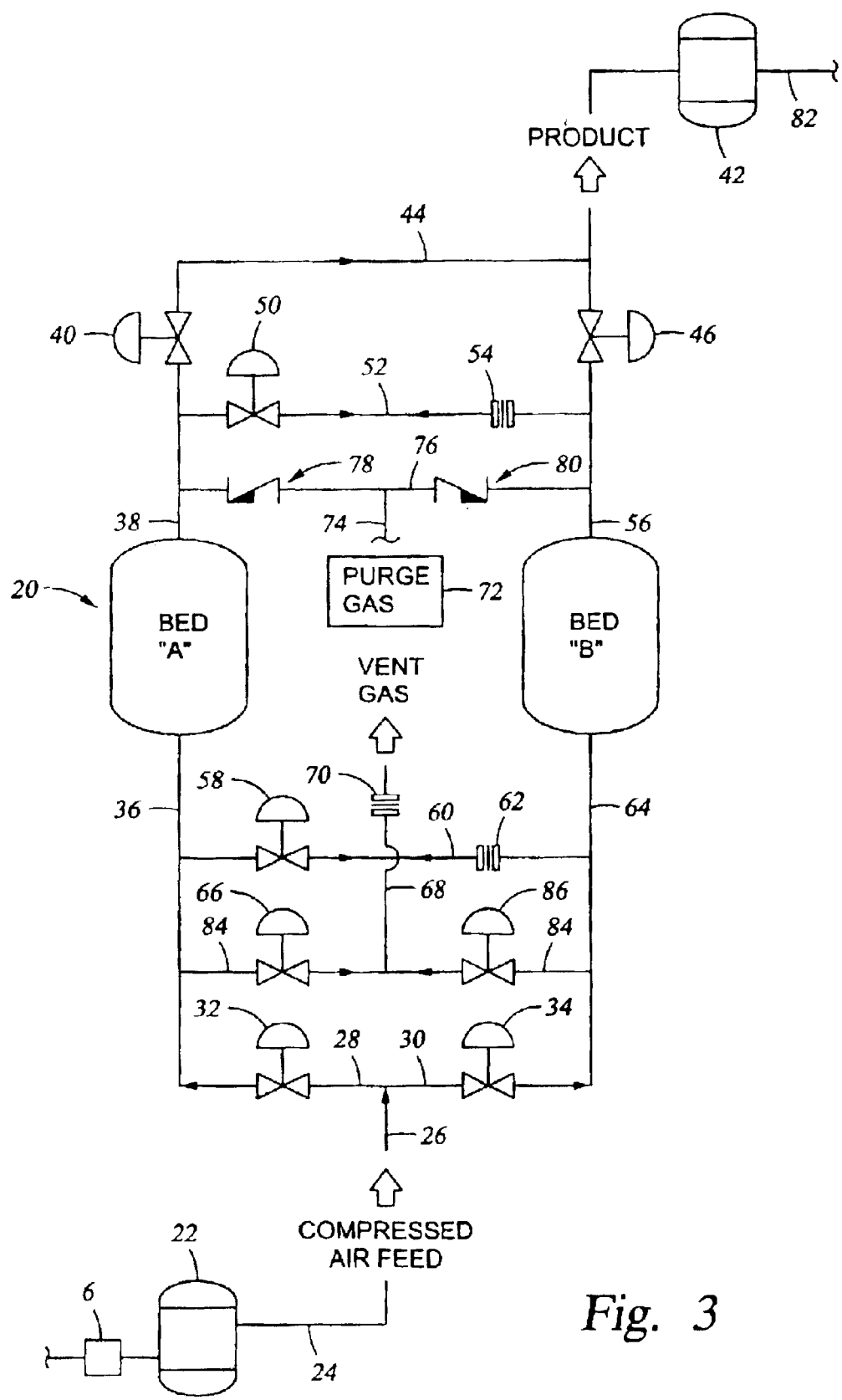
FIG. 3 is a schematic view of a two bed pressure swing adsorption system for generating a nitrogen rich gas.

The present invention is directed to the on-site, non-cryogenic production of an inert gas, typically a nitrogen rich gas and its delivery in the cleaning out, treating or servicing of oil and/or gas or geothermal wells. As used herein "treating" refers to the stimulation or priming of a well to stimulate a formation in order to increase production therefrom. "Servicing" refers to any number of operations including the pressure testing of downhole tools, like plugs or packers that seal a wellbore or an annular area within a wellbore. As used herein the term "nitrogen rich gas" shall refer to a gas containing predominantly nitrogen gas and no more than 10% oxygen gas by volume. The nitrogen rich gas is produced from air by a number of different methods including membrane separation, pressure swing adsorption, vacuum swing adsorption and fuel cells. The methods of production are described in U.S. Pat. No. 5,388,650 to Michael and that patent is incorporated by reference herein in its entirety.

Referring to FIG. 1 there is shown an above ground installation for producing a nitrogen rich gas using membrane separation and for delivery of the nitrogen rich gas to the drilling region. A feed air compressor 2 includes an intake port 4 for receiving ambient air and a compressor 6 for pressurizing the air to a suitable pressure, typically in the range from about 100 to 350 psig. The compressed air is sent through a conduit 8 to an air separation membrane system shown generally by numeral 10. The membrane is composed of bundles of hollow fiber, semi-permeable membranes which are assembled parallel to a central core tube. The bundle is placed into an outer case to form an air separation module. The air is divided into two streams; a nitrogen rich stream and a stream rich in oxygen and water vapor.

When the compressed air is introduced to the feed side of the membrane fibers, the air travels down the bore of the hollow permeable fibers. Oxygen, water vapor and other "fast gases" pass through to the outside of the fibers. The oxygen-rich gas stream then flows through the fiber bundle to the periphery of the outer case of the separator system where it is discharged as a by-product. While all but a small fraction of the oxygen passes through the membrane material to the exterior of the hollow fibers, most of the nitrogen present in the feed air is contained within the hollow fiber membrane. As a result, the nitrogen rich gas is effectively separated from the feed air and exits the membrane system 10 via a conduit 12 for entry into an optional booster compressor 14.

The booster compressor 14 is employed to elevate the pressure of the nitrogen rich gas. The pressure of the gas obtained from the air separation membrane system 10 is from about 100 to 200 psig. The booster compressor 14 is capable of raising the pressure of the nitrogen rich gas up to or exceeding 4500 psig and even as high as about 10,000 psig, but typically in the range of from about 1,000 to 2,000 psig. The highly compressed nitrogen rich gas leaves the booster compressor 14 via a conduit 16 and is sent to a surface equipment installation 18 of the drilling operation as explained in detail hereinafter.

The nitrogen rich gas may also be produced by a pressure swing adsorption system in accordance with the present invention. Referring to FIGS. 2 and 3, there is disclosed a pressure swing adsorption unit 20 having two beds "A" and "B". It should be understood, however, that the present invention is applicable to pressure swing adsorption units having an alternate construction such as a greater number of beds. Referring to FIG. 3, air from a source (not shown) is fed to a compressor 6 to raise the pressure of the air, to accumulate compressed air during the non-production phase and to output compressed air during peak loading of the beds. The compressed air is fed to a storage vessel 22. The compressed air is then fed via the conduit 24, 26 to an outlet 28 leading to bed A and an outlet 30, leading to bed B. Each outlet 28, 30 is controlled by respective valves 32, 34. When valve 32 is opened, allowing the compressed air to reach bed A, valve 34 remains closed so that bed B may undergo regeneration during the depressurization phase of the pressure swing adsorption unit 20.

The compressed air enters the bed A through the open valve 32 via a conduit 36. The bed A contains at least one adsorption material capable of preferentially adsorbing oxygen and other waste gases. The preferred adsorbents are selected from molecular sieves and silica gel. As a result, substantially pure nitrogen passes out of the bed A through a conduit 38, a valve 40 and into a nitrogen storage vessel 42 via a product line 44 for passage via a conduit 82 to an optional booster compressor 14, like the one shown in FIG. 1.

While bed A is producing nitrogen gas, bed B is at atmospheric pressure. Upon completion of the nitrogen production cycle in bed A, the system undergoes equalization to raise the pressure in bed B to an intermediate pressure. This is accomplished by closing the nitrogen product valves 40, 46 and the compressed air intake valves 32, 34. Thus, the input of compressed air and the output of nitrogen product are temporarily suspended. Equalization is accomplished by passing a portion of the pressurized gas from the top of the bed A via a conduit 38, valve 50, a conduit 52, restrictive orifice 54, through a conduit 56 and into the top of the bed B. In addition, pressurized gas is passed from the bottom of the bed A via the conduit 36, a valve 58, a conduit 60, a restrictive orifice 62 and a conduit 64 into the bottom of bed B.

Once equalization is completed so that bed A and B are at similar pressures, bed A undergoes regeneration by depressurizing to atmospheric pressure to remove the oxygen enriched waste gases. This is accomplished by closing the equalization valves 50, 58 and opening a regeneration valve 66 for the bed A. The waste gas is then vented to the atmosphere through a conduit 68 and a restrictive orifice 70. As a consequence, the bed A is regenerated. Further cleansing of the bed A may be made by passing a purge gas, such as substantially pure nitrogen gas, from a source 72, through conduits 74 and 76, respectively, a valve 78 and into bed A via the line 38. When the bed B is further cleansed, the purge gas passes through the conduits 74 and 76, respectively, a valve 80 and the conduit 56. After purging, the adsorbents are ready for adsorbing waste gases in a new nitrogen production cycle.

Since the pressure in bed B has been raised to an intermediate pressure, it is ready to receive compressed air. The compressed air is provided through the valve 34 and the conduit 64. It may be necessary, in order to get sufficient compressed air to quickly load bed B up to operating pressure, for the compressed air feed generated by the compressor 6 to be supplemented by compressed air already stored in the storage vessel 22. Once bed B has been loaded, the valve 46 is opened, allowing product gas to enter the product line 44 via the conduit 56 from which it enters the storage vessel 42. A distribution conduit 82 extends from the storage vessel 42 to provide a flow of nitrogen rich product gas to the booster compressor 14 shown in FIG. 1. After nitrogen production in bed B is completed, the valve 46 is closed as is the valve 34 to stop the compressed air feed. The equalization circuit is activated by opening valves 50, 58 and the pressurized gas is fed from the top and bottom of bed B to bed A to raise the pressure therein to an intermediate pressure level. Bed B is then depressurized by eliminating the oxygen rich waste gases which are sent via the conduits 64, 84 through a valve 86 to the atmosphere via the conduit 68 and restrictive orifice 70.

Thereafter, compressed air from the compressor 6 and the storage vessel 22 is fed to bed A through the valve 32 via the conduit 36 to raise bed A to the desired operating pressure thereby commencing the nitrogen production cycle from bed A which passes into the booster compressor 14. The nitrogen rich gas, after compression up to as high as 10,000 psig in the booster compressor, 14, is sent to surface equipment installation shown in FIG. 4, where it is used in the cleaning out of the well shown in FIG. 5.

Figure 4:
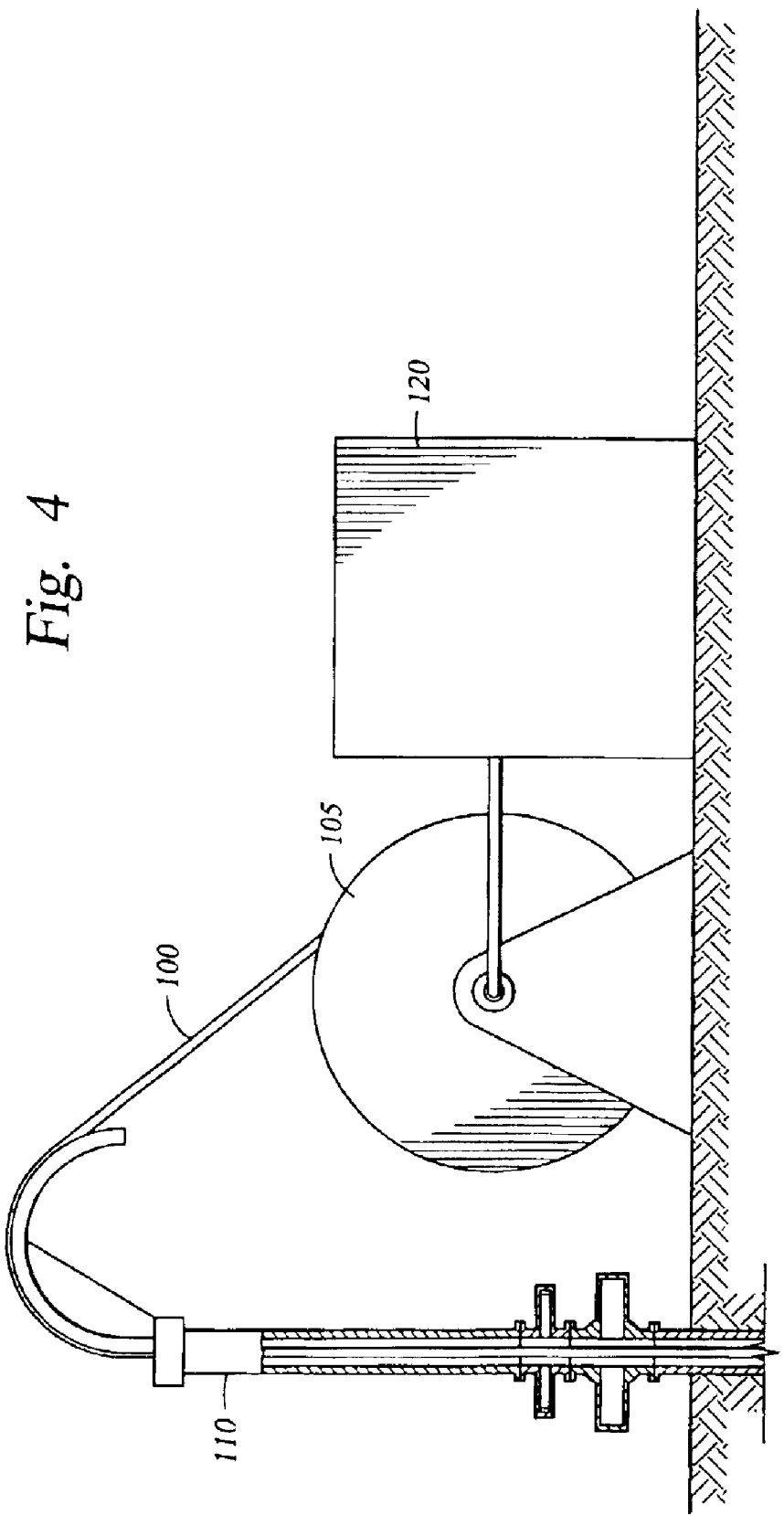
FIG. 4 is a schematic view of a surface equipment installation including coiled tubing for delivering the inert gas to the area of the well to be cleaned out.

Referring to FIG. 4, in one embodiment, the high pressure nitrogen rich gas is delivered to the wellbore from a source 120 through coiled tubing 100. The coiled tubing is charged with the gas at a reel 105 and extends through a stripper assembly 110. The flow rate of the nitrogen rich gas is typically measured by an orifice meter and is sent through an adjustable choke and a pressure shut off valve (not shown) before entering the wellbore. Foam can be added to the gas if it is required for downhole circulation. The foam is used to assist in well stimulation or removal of the sand, scale or other matter inhibiting the production of the well. The surface installation may optionally include an injector manifold for injecting chemicals, such as surfactants and special foaming agents, into the nitrogen rich gas feed stream to help dissolve and carry away particulate matter or to provide a low density, low velocity circulation medium of stiff and stable foam chemicals to cause minimum disturbance to unstable or unconsolidated formations.

Figure 5:
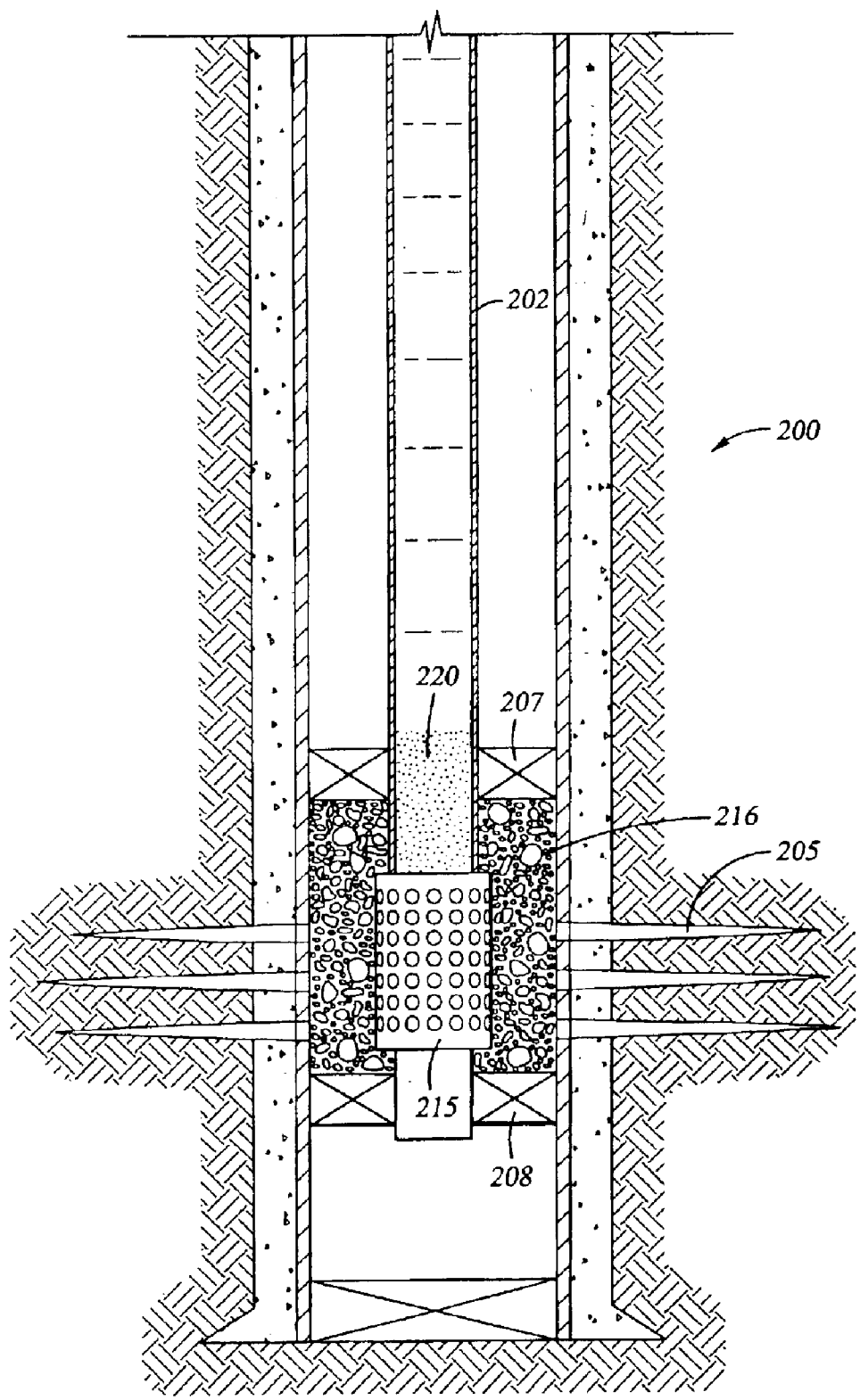
FIG. 5 is a schematic view of a wellbore showing an area of the well inhibited by the accumulation of sand in production tubing.

FIG. 5 is a section view of a cased wellbore 200 with production tubing 202 extending to a location adjacent casing perforations 205. An annular area 216 is isolated by upper and lower packing members 207, 208. The production fluid enters production tubing 202 through a perforated screen member 215. In the preferred embodiment, annular area 216 is packed with gravel to encourage migration of production fluid from the surrounding formation into the wellbore. As illustrated, sand (shown as 220) has migrated through the perforated screen member 215 into the interior of production tubing 202 and inhibited production of the well.

Figure 6:
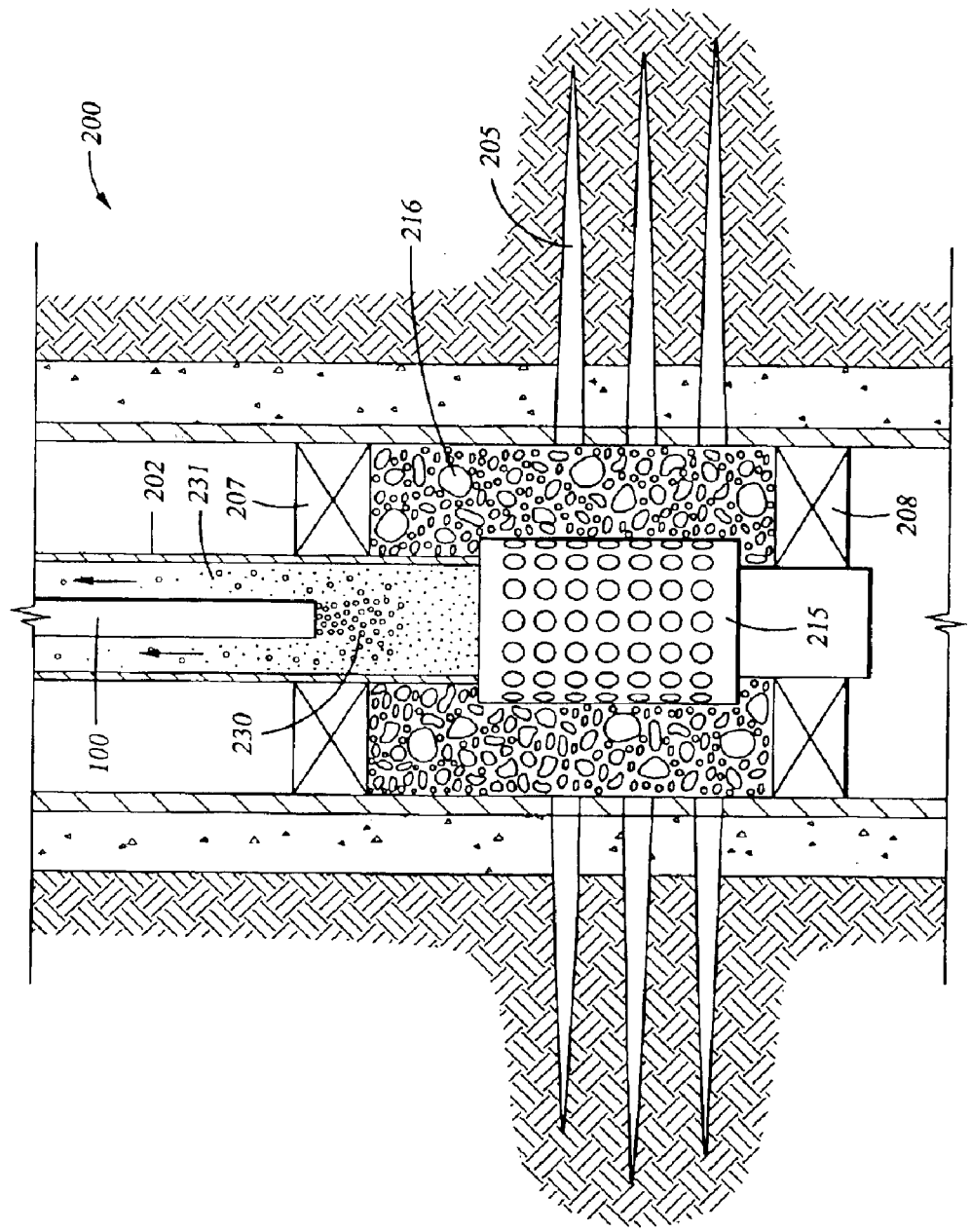
FIG. 6 is a schematic view of the well of FIG. 5 shown during well clean out using coiled tubing.

FIG. 6 illustrates one embodiment of the cleaning out method of the present invention in progress. Coiled tubing 100 (see also FIG. 4) has been inserted into the production tubing 202 to provide a pathway for the flow of pressurized nitrogen rich gas (shown as bubbles 230) from the surface of the well to the area of the well to be cleaned out. As the lower end of the coiled tubing 100 breaches the area of sand in the production tubing 202, gas is injected into the well via the coiled tubing. An annular area 231 formed between the coiled tubing 100 and the production tubing 202 provides a pathway for the return nitrogen rich gas and with it, particulate matter, like sand, to the surface of the well where it is collected and disposed of. The coiled tubing 100 is typically pumped up and down in the area of particulate matter, in order to agitate the material and to facilitate its removal during the clean out.

In operation, the nitrogen rich gas produced by the air separation membrane system 10 or the pressure swing adsorption unit 20 or other non-cryogenic system typically has a nitrogen content of at least about 85% by volume, preferably at least about 95% by volume, and an oxygen content of no more than 10% by volume, preferably less than about 5% by volume. The nitrogen rich gas is sent to a booster compressor 14 where the pressure is raised to as high as 10,000 psig or more, typically in the range of about 1,000 to 2,000 psig. The pressurized nitrogen rich gas is sent to the surface equipment shown in FIG. 4 where it is monitored and metered into the wellbore through the pathway within the coiled tubing 100.

Because the nitrogen rich gas is under pressure, it swirls around the area to be cleaned out with sufficient force and velocity to carry the particulates upward into the pathway created within annular area 231. The particulate-containing stream then exits the production tubing at the surface of the well where it is carried to a blooey line and eventually discarded into a collection facility, typically at a location remote from the actual well site.

EXAMPLE

A typical well cleanout is performed in a series of sequential steps. First, nitrogen is produced on site using any of the foregoing methods. Second, coiled tubing is placed in the well and lowered a predetermined distance to the area of the well where production is inhibited. Third, the gas, as well as foam is introduced simultaneously into the coiled tubing. Fourth, the coiled tubing is pumped up and down in the well to agitate the substance inhibiting production and encourage its removal. Fifth, the return of material at the surface is measured and monitored. Finally, when the material carried by the return gas has diminished to an acceptable level, the cleanout operation is discontinued. The flow rate of nitrogen rich gas to the drilling region of an oil and/or gas well or a geothermal well can vary over a wide range depending on the size of the downhole, the depth of the well, the rate of production and, the size of the production tubing.

A typical cleaning out operation will require the production of from 1,500 to 3,000 standard cubic feet per minute (scfm) of nitrogen gas from an air separation system which can be anyone of a number of conventional systems including an air membrane separation system or a pressure swing adsorption system. The purity of the nitrogen gas may vary, but is nominally set at no more than about 5% by volume of oxygen. The resulting nitrogen rich gas is then pressurized up to a pressure of from about 1,500 to 2,000 psig before being passed to the area of the well to be cleaned out.

A cleaning out operation will take about two days, although very clogged wells may require more time. The nitrogen rich gas delivery system is designed for continuous operation and all of the nitrogen rich gas is generated on-site without the need for external nitrogen replenishment required for cryogenically produced liquid nitrogen delivery systems.

While the foregoing is directed to the preferred embodiment of the present invention, other and further embodiments of the invention may be devised without departing from the basic scope thereof, and the scope thereof is determined by the claims that follow. For example, in addition to well clean out, the on site production of non-cryogenic nitrogen provides a source of gas for servicing or stimulating a well or for pressure testing downhole devices like packers, and the invention is not limited only to the method of cleaning out a well.

What is claimed is:

1. A method for servicing a wellbore, comprising:
separating at least a substantial portion of oxygen contained within a fluid feed stream to produce a substantially inert gas and a fluid byproduct, wherein oxygen is removed by passing the fluid feed stream through a membrane which preferentially separates the inert gas from the other components in the fluid feed stream;
increasing the pressure of the substantially inert gas; and
passing the substantially inert gas through a perforated screen disposed in an isolated annular area of the wellbore to supply the substantially inert gas to the wellbore.

2. The method of claim 1, wherein the substantially inert rich gas is nitrogen rich gas.

3. The method of claim 1, further including pumping the substantially inert gas through a coil tubing assembly.

4. The method claim 1, wherein an additive is combined with the inert rich gas.

5. The method of claim 1, wherein the pressure of the substantially inert gas is boosted to at least 1000 psig.

* * * * *